2,799,613

FUNGICIDES AND BACTERICIDES AND PROCESS OF APPLYING

Hans-Karl Blödorn, Darmstadt-Trautheim, Germany, assignor to E. Merck Aktiengesellschaft, Darmstadt, Germany, a corporation of Germany No Drawing. Application September 9, 1954, Serial No. 455,092

6 Claims. (Cl. 167—30)

This invention relates to fungicides and bactericides. In particular, it is directed to the utilization of the newly discovered fungicidal and bactericidal properties of dibromo-pentachloro-cyclohexane.

It has been found that the dibromo-pentachloro-cyclohexane (as contrasted with the different isomeric hexachloro-cyclohexanes) shows fungicidal and bactericidal characteristics; and as a result of such discovery it is now possible to produce valuable products for the protection of organic materials from the action of fungi and bacteria; for the protection and treatment of the skin; and other uses.

Accordingly, the present invention is directed to fungicidal and bactericidal products which are characterized by containing dibromo-pentachloro-cyclohexane as the essential active ingredient.

Such products may, optionally also contain other pesticidal or pest controlling substances (particularly insecticides). The means for accomplishing such objects may consist of or comprise, for instance, powdery mixtures of the dibromo-pentachloro-cyclohexane (referred to hereinafter as the "active ingredient") with inert diluents such as talc, kaolin, kieselguhr, slate flour, etc.; or with spraying means (the active ingredients being in the form of solution or as a fine powder mixed, for example, with peat, chaff, wood shavings, sawdust, powdered pumice or with other absorbent materials). There is a very wide field of application for solutions of the active ingredient in organic solvents or in aqueous emulsions and suspensions, which are produced in accordance with known methods and which may include additives as, for example, wetting and emulsifying agents, solubilizers, adhesives, etc. The active ingredient of the instant invention is also very suitable for distribution in the nebulized state by means of aerosols (as by solution in organic solvents or in gases liquefied under pressure or mixtures thereof) which may be vaporized or distributed as in the form of fumes for fumigating either by themselves or with the usual additives.

Such preparations are intended primarily for the protection of living as well as lifeless organic material from attack by fungi and bacteria. Among such applications are: the preservation of foods, wood (lumber, railroad ties, poles, telegraph posts, flooring, mining timbers, roofing boards, etc.), masonry, organic mass products, junk or old material, plant fibres, fabrics, drugs, potatoes, turnips, plant seeds, etc.) leather and other animal products (wool, paper), packing materials, and similar items. The substances of the instant invention are also suitable for the protection of living plants or animals against the action of fungi and bacteria; and for counteracting harmful organisms present in the soil (for instance, to disinfect the soil), optionally, mixed with other fungicides, as for example, organic mercurials, etc. They may also be incorporated in paints, stucco, plaster or other protective coatings. There is also a large field of application for the products of this invention in so-called technical preservatives for the protection, for example, of glues and in the textile industry; and as a disinflectant (as in the form of solutions, emulsions, fumigants and sprays) for all purposes of disinfecting articles, consumer items, organic materials or areas.

A marked and specific advantage of the instant invention, as contrasted with very many known preservatives, resides in the fact that the products in accordance with the instant invention do not have an unpleasant odor.

It has also been found that the dibromo-pentachlorocyclohexane may be incorporated in various cosmetic articles such as skin creams, lipsticks, nail polish, etc. When present as an ingredient of such articles, the fungicidal and/or bactericidal characteristics thereof provide enhanced utility of those articles.

In actual clinical investigations carried out during a period of two years, it has been found that liquid and salve-like preparations containing the dibromo-pentachlorocyclohexane provide unequivocally superior results. The active ingredient has been found to provide the desired effect when present in an amount of about 0.5 percent in such salves and solutions.

Both types of preparations were found to be well tolerated except in the cases of acutely inflamed efflorescent conditions. When higher concentrations of the active ingredient were present, that is in excess of 0.5 percent, there were occasional complaints that a burning sensation was felt.

The salve base-active ingredient-containing- and the solvent-active ingredient-containing-products were found to be excellently tolerated in very extensive clinical tests. Since the active ingredient imparts a noticeable odor to such preparations or articles, the odor may be masked, if desired, by incorporating suitable odor-masking materials to meet the objections of some persons who may object to the odor.

The by-products arising from the manufacturing of insecticides such as gamma-hexachloro-cyclohexane, particularly from the manufacture of delta-hexachloro-cyclohexane, provide sources for the convenient product of dibromo-pentachlorocyclohexane by the splitting off of hydrogen chloride followed by bromination.

The active ingredient of the instant invention may be manufactured, for example, as follows:

25.4 grams (0.1 mol) of pentachloro-cyclohexane made from delta hexachloro-cyclohexane (F. P. 65°–67° C.) are dissolved in 150 cc. of carbontetrachloride at room temperature. After adding thereto 16.0 grams (0.1 mol) of bromine, the solution is irradiated in a quartz flask, closed with a small $CaCl_2$ tube for twenty hours with an Osram-Ultra-Vitalux-Lamp (300 watts). At the end of the irradiation, some of the bromine is still unconsumed and the solution has a brown color. However, continued irradiation does not result in complete decoloration. Analysis shows that there are still present 2.14 grams of unreacted bromine. After distilling off the solvent under vacuum, there is obtained a residue of 40.9 grams of slightly yellowish crystals which begin to sinter at 106° C. and melt between 116° C. and 118° C. When this mass of crystals is recrystallized from 135 cc. of ethanol, there is obtained 28.4 grams of glossy needle-like odorless crystals having a F. P. of 121°–122° C. The dibromo-pentachloro-cyclohexane thus produced is readily soluble in acetone and benzene, less readily soluble in carbontetrachloride, ethanol and petroleum ether, and practically insoluble in water.

The fungistatic characteristics of the active ingredient has been determined by adding minimal quantities thereof (dissolved in ethanol) in the conventional manner to agar nutrient media, and observing for a seven-day period the absolute inhibition of the mycelial growth on the surface of the agar streaked with the fungal spores. The active nutrient showed absolute inhibition of fungal growth for various pathogenic dermatophytes in concentrations as low as from 1 to 80,000 to 1 to 160,000; for penicillium (the most frequently encountered mold) at 1 to 40,000 and for mucor at 1 to 80,000.

The fungicidal potency of the active ingredient has been determined by dissolving the active ingredient in ethanol in accordance with the method of Golden and Oster [Journal of American Pharmaceutical Association, vol. 36 (1947), page 359] whereby the alcoholic solution is allowed to act for one minute on a stem of trichophyton. The mycelial mat was previously saturated with serum. Subsequently, it was washed twice with bouillon and once with acetone. 25 mgm. per cubic centimeter produced complete mortality. Partial mortality was produced by appreciably lower concentrations.

The investigation of the bacteriostatic activity of the dibromo-pentachloro-cyclohexane was determined by means of solutions of the active ingredient in 96 percent ethanol on poured agar cultures to which coli, paty, Staphylococci and Streptococci were added.

*Germ-inhibiting concentrations: gamma/cc.*

POURED AGAR CULTURES

|  | Coli | Paty [1] | Staph. | Strept. |
|---|---|---|---|---|
| relative | 1.6 | 1.6 | 1.6 | 3.125 |
| absolute | 12.5 | 25 | 25 | 6.25 |

[1] The term "Paty"=paratyphoid.

Poured agar cultures under unfavorable conditions in the presence of 10 percent serum, more particularly, 5 percent blood.

|  | Coli | Paty | Staph. | Strept. |
|---|---|---|---|---|
| relative | 1.6 | 1.6 | 25 | 25.5 |
| absolute | 25 | 50 | 100 | 100 |

This bacteriostatic effect is extraordinarily high. It is of the order of magnitude of the chemically dissimilar, more complicated and much more difficultly preparable sulfonamides.

It is important in this connection to note that the active ingredient of the instant invention has been found to be but slightly toxic when tested on mammals. For example, mice fail to show any toxic effects when subjected to doses of 3.0 grams per kg. of body weight.

The following are several examples setting forth the preparation and application of products embodying the active ingredient. The term "active ingredient" as herein used always refers to the dibromo-pentachloro-cyclohexane. It will be understood that additional pesticides (insecticides, bactericides, fungicides, etc.) may be added to increase the effect.

EXAMPLE 1

One part of the active ingredient is ground with 10 to 30 parts of a vehicle such as kieselguhr, talc, kaolin, slate flour or similar materials for several hours in a ball mill so that an intimate mixture of the active ingredient and the vehicle is produced. The resultant product is an excellent fungicidal and bactericidal substance which can be used on perishable or organic materials attacked by fungi or bacteria.

EXAMPLE 2

To counteract soil fungi and soil bacteria (in agriculture or in forestry) one part of the active ingredient is mixed with from 2 to 20 parts of a spreadable material such as sand, chaff, powdered pumice, either by themselves or in mixture with mineral or organic fertilizers.

EXAMPLE 3

Stable sprayable solutions having good fungicidal and bactericidal characteristics, which are stable even in dilutions of from 1:10,000 in water, are made by dissolving from 0.5 to 0.7 part of the active ingredient in 34.5 parts of methanol to which is added 65 parts of a suitable emulsifier, for example, Emulsogen E1.

EXAMPLE 4

The active ingredient may be pressed into the form of tablets, with or without the addition of suitable combustible materials, and ignited to smolder as a fumigant.

EXAMPLE 5

Solutions of the active ingredient in organic solvents such as methanol, chlorobenzene and others make it possible to effectuate good penetration into wood and hence can be used in combination with Carbolineum and other similar substances for the preservation of wood against attack by fungi and bacteria.

It will be understood that the foregoing description of the invention and the examples set forth are merely illustrative of the principles thereof. Accordingly, the appended claims are to be construed as defining the invention within the full spirit and scope thereof.

I claim:

1. Process of treating infestations by a member of the group consisting of molds and bacteria which comprises subjecting the infestation to the action of dibromo-pentachloro-cyclohexane.

2. Cosmetic products comprising a cosmetic base and di-bromo-pentachloro-cyclohexane.

3. Process of preserving matter against attack by members of the class consisting of molds and bacteria which comprises treating said matter with di-bromo-pentachloro-cyclohexane.

4. A lipstick comprising a lipstick base and di-bromo-pentachloro-cyclohexane.

5. A skin cream comprising a cream base and di-bromo-pentachloro-cyclohexane.

6. A nail polish comprising a nail polish base and di-bromo-pentachloro-cyclohexane.

References Cited in the file of this patent

Riemschneider, Z. Naturforsch., vol. 7b (1952), pages 125–128.

Brown, Insect Control by Chemicals (1951), pages 100–103.